United States Patent
Bevan (10) Patent No.: US 12,169,809 B2
(45) Date of Patent: Dec. 17, 2024

(54) VEHICLES AND TRANSPORTATION SYSTEMS EMPLOYING BLOCKCHAIN-BASED MONITORING

(71) Applicant: Utterberry Limited, London (GB)

(72) Inventor: Heba Bevan, Bromley (GB)

(73) Assignee: UTTERBERRY LIMITED, London (GB)

( * ) Notice: Subject to any disclaimer, the term of this patent is extended or adjusted under 35 U.S.C. 154(b) by 443 days.

(21) Appl. No.: 17/426,543

(22) PCT Filed: Jan. 21, 2020

(86) PCT No.: PCT/GB2020/050134
§ 371 (c)(1),
(2) Date: Jul. 28, 2021

(87) PCT Pub. No.: WO2020/157462
PCT Pub. Date: Aug. 6, 2020

(65) Prior Publication Data
US 2022/0092532 A1    Mar. 24, 2022

(30) Foreign Application Priority Data
Jan. 29, 2019  (GB) ..................................... 1901183

(51) Int. Cl.
*G06Q 10/0833* (2023.01)
*G06Q 10/0835* (2023.01)
(Continued)

(52) U.S. Cl.
CPC ..... *G06Q 10/0833* (2013.01); *G06Q 10/0835* (2013.01); *H04L 9/3213* (2013.01); *H04L 9/50* (2022.05)

(58) Field of Classification Search
CPC ............ G06Q 10/0833; G06Q 10/0835; H04L 9/3213; H04L 9/50
See application file for complete search history.

(56) References Cited

U.S. PATENT DOCUMENTS 9,228,911 B1 *  1/2016  Meyers .................... G08G 1/00
2017/0278063 A1 *  9/2017  Dixon .................. A47G 29/141
(Continued)

FOREIGN PATENT DOCUMENTS

KR       2015055286 A  *  5/2015  ......... G06K 7/10128

OTHER PUBLICATIONS

Groenfeldt, Tom. "IBM and Maersk apply blockchain to container shipping". Forbes, Mar. 5, 2017, https://www.forbes.com/sites/tomgroenfeldt/2017/03/05/ibm-and-maersk-apply-blockchain-to-container-shipping/#34581ba33f05 (Year: 2017).*

*Primary Examiner* — Shannon S Campbell
*Assistant Examiner* — Manal A. Alsamiri
(74) *Attorney, Agent, or Firm* — Tarolli, Sundheim, Covell & Tummino LLP (57) ABSTRACT

A vehicle for use with a blockchain-based transportation system for automated assessment of transportation of goods, the vehicle comprising: a goods storage region configured to carry one or more goods packages, each package having a package tag, the package tag comprising an electronic identification system including a package blockchain defined by package blockchain data comprising a package block, the package block comprising package data including at least a package identifier; a vehicle blockchain defined by vehicle blockchain data comprising a vehicle block, the vehicle block comprising vehicle data including at least a vehicle identifier; and a controller configured to communicate with the electronic identification system of each package to retrieve the package blockchain data and to generate updated blockchain data using the vehicle blockchain data and the retrieved package data of each package; wherein the updated blockchain data is available for assessment of transportation of the goods packages.

20 Claims, 8 Drawing Sheets

(51) Int. Cl.
*H04L 9/32* (2006.01)
*H04L 9/00* (2022.01)

(56) References Cited

U.S. PATENT DOCUMENTS

| | | |
|---|---|---|
| 2018/0144298 A1 | 5/2018 | Rankin |
| 2018/0232693 A1* | 8/2018 | Gillen ................ G06Q 10/0834 |
| 2018/0336515 A1 | 11/2018 | Mehring et al. |
| 2019/0012637 A1 | 1/2019 | Gillen |
| 2020/0164886 A1* | 5/2020 | Dutta ...................... G06F 21/64 |

* cited by examiner

VEHICLES AND TRANSPORTATION SYSTEMS EMPLOYING BLOCKCHAIN-BASED MONITORING

RELATED APPLICATIONS

The present invention is a U.S. National Stage under 35 USC 371 patent application, claiming priority to Serial No. PCT/GB2020/050134, filed on 21 Jan. 2020; which claims priority of GB 1901183.2, filed on 29 Jan. 2019, the entirety of both of which are incorporated herein by reference.

TECHNICAL FIELD

The present disclosure relates to a vehicle for the transportation of goods. In particular, the present disclosure relates to a vehicle for use with a blockchain-based transportation system for automated assessment of transportation of goods

BACKGROUND

A wide variety of vehicles can be used to transport goods including land vehicles including trains, cars and lorries, watercraft including ships and boats, and aircraft including planes and drones. When transporting goods over land, sea and air borders it is necessary to track the vehicles, people and goods and there must be inspection points at which to inspect the land, water and air vehicles, to inspect people and to assess tariffs on goods that move between one point outside of the border to another at or within the border.

These inspection points introduce delay in the movement of vehicles, people and goods. The volume of vehicles, people and goods that pass through assessment and inspection points, inspection time limitations, and physical human involvement in checks, all mean that assessment and inspection are sometimes done on a random or otherwise uncomprehensive basis leading to inaccuracies.

Some vehicles, people and/or goods pass over borders and through inspection points that should not and there is a need to identify such occurrences.

Furthermore some goods pass over and through borders and/or inspection points without having goods standards assessed thus goods are able to pass into a country or region that do not meet the regulatory standards of that location.

SUMMARY

In a first aspect there is provided a land, sea or air vehicle for use with a blockchain-based transportation system for automated assessment of transportation of goods. The vehicle may be, for example, a van, lorry, ship, or aeroplane, or any other mode of transport (goods carrier) suitable for carrying goods.

In implementations the vehicle comprises a goods storage region configured to carry one or more goods packages, each package having a package tag. The package tag may comprise an electronic identification system, e.g. an RFID system or some other item tagging system, including package blockchain data, e.g. one or more files in local or remote non-volatile storage. The package blockchain data may comprise one or more package blocks; a package block may comprise package data including at least a package identifier e.g. a hash of the block.

In implementations the vehicle further comprises, e.g. as one or more files in local or remote non-volatile storage, a vehicle blockchain defined by vehicle blockchain data comprising one or more vehicle blocks. A vehicle block may comprise vehicle data including at least a vehicle identifier, which may include or consist of a hash of the block.

In implementations the vehicle may further comprise a controller configured to communicate with the electronic identification system of each package to retrieve the package data and to generate updated blockchain data using the vehicle blockchain data and the retrieved package data of each package. The controller may comprise a processor coupled to memory storing processor control code and to a communications interface. The updated blockchain data may be generated locally and/or remotely. In implementations the updated blockchain data is available for assessment e.g. verification in any suitable manner, of transportation of the goods packages. The controller may store and/or transmit or otherwise communicate the updated blockchain data.

Thus implementations of the vehicle can provide a technical solution to the problem of transporting goods e.g. across national or other borders, by providing a system to verify transportation of the goods. For example the updated blockchain data can provide electronic evidence of, for each package, loading of the package at a first location, delivery of the package to a second location, and a lack of tampering with contents of the vehicle or package between the first and second locations. As further described below, in implementations the updated blockchain data can provide electronic evidence that no illicit goods or unauthorized persons were transported.

In some implementations the controller is configured to generate updated blockchain data by linking the package blockchain of each package to the vehicle blockchain to generate a first transport blockchain. The first transport blockchain may comprise at least the vehicle data and the package data for each package. As described later, the package data may be updated prior to generating the first transport blockchain. In general generating the first transport blockchain uses the vehicle data and a hash value from the vehicle blockchain (e.g.), as well as the (updated) package data. The hash value of the vehicle blockchain may be a hash value of an end block of the vehicle blockchain (or, where implemented, an updated vehicle blockchain). The hash value of the vehicle blockchain may be incorporated into a genesis block of a first package blockchain. The resulting hash value of this linked chain is incorporated into a genesis block of a second package blockchain. This process is repeated for all the packages thereby generating the first transport blockchain.

Thus in implementations each transaction which involves adding or removing a package (and/or, as described later, pallet) may create a new, linked blockchain. In general when data is added to the evidential chain as described below a new blockchain is created e.g. by updating the relevant package blockchain(s) and then linking these to the (potentially also updated) vehicle blockchain.

However in other cases data may be added to the evidential chain by updating the relevant package blockchain(s), e.g. by adding a further block to these, without necessarily creating a new linked blockchain.

An approach which generates updated blockchain data by generating a new transport blockchain can provide the advantage of tying the updated package data together with the vehicle data in a single, new transport blockchain package. It can also facilitate controlling user access to parts of the data within the blockchain, so that an identified user or a user in possession of a token, is only permitted access to selected data.

In some implementations the vehicle may comprise a door sensor to detect closure of a door to the goods storage region. The controller may be configured to generate the updated blockchain data in response to the door sensor detecting closure of the door. In an implementation where blockchains are linked, closure of the door may be used as a signal to synchronize updates of the package blockchains and then to create the transport blockchain, rather than e.g. creating multiple new transport blockchains in the order that packages are discovered. This can help to provide efficient use of non-volatile memory storing the transport blockchain by inhibiting the proliferation of blockchains. This approach also provides an anti-tamper function since the transport blockchain is only created once the door is closed and the packages present cannot easily be changed. In some implementations the first transport blockchain may also include, for each package, data defining the time and/or location at which the package was loaded onto the vehicle.

In some implementations the controller is configured to automatically detect removal of one or more of the packages from the goods storage region, e.g. using RFID, and to generate a second transport blockchain. The second transport blockchain may comprise a linking of the vehicle blockchain to the blockchains of the remaining packages. Thus the second transport blockchain may comprise at least the vehicle data and the package data for each package remaining in the goods storage area. In some implementations the second transport blockchain may also include, for each package, data defining the time and/or location at which the package was unloaded from the vehicle.

It will be appreciated that although the terminology first and second transport blockchain is employed in general there may be a new first transport blockchain created each time one or more packages is added to the vehicle; and similarly there may be a new second transport blockchain created each time one or more packages is removed from the vehicle.

In some implementations the door sensor may also be configured to detect opening of the door to the goods storage region; the controller may then automatically, e.g. using RFID, detect removal of one or more of the packages from the goods storage region. The controller may again be configured to generate the second transport blockchain in response to the door sensor detecting closure of the door. The vehicle and/or a pallet (see later) may include a weighing system e.g. pressure sensing system for weighing the transported goods. Optionally the weight may be verified and/or updated every time the door is opened and/or closed; this may involve adding a new block to a package blockchain to record this information and/or adding a block to the transport blockchain or generating a new version of the transport blockchain. As previously mentioned the recorded data may include a time/place of additional/removal of a package (here and in general "time" may have a granularity of seconds, minutes, days, hours, weeks, months, or years).

Thus in some implementations the package data may include a package weight. The updated blockchain data may include data defining a total weight of the packages (as individual weights and/or as a total weight). This may be checked manually. However in implementations the goods storage region includes a package weight sensor to sense a weight of the packages in the goods storage region e.g. a pressure pad, e.g. incorporated into a pallet which may be in communication with the controller. The controller may be configured to check the sensed weight of the goods packages against the total weight of the packages, and to generate alert data e.g. in a new (updated) transport blockchain and/or to generate an alert in response to detection of a mismatch. In this way the integrity of the transported goods may be verified and the absence (or otherwise) of illicit cargo may also be confirmed.

The vehicle data may include a weight data defining a weight of the vehicle, and optionally of its passengers (which here includes a driver/captain), and optionally of its fuel. The controller may be configured to report a total weight of the vehicle e.g. to a remote server, for verification. This total weight may comprise a weight of the vehicle, of the packages in the goods storage region (optionally including any pallets), and optionally of the passengers, and optionally of the fuel, optionally accounting for fuel use since the fuel weight was provided/determined (e.g. measured). In implementations the controller and/or a remote server may be configured to communicate with a vehicle weighing system to obtain a measured weight of the vehicle (with or without passengers) which may then be compared with the evidentially stored weight data to identify potential tampering with the transported packages and/or the presence of illicit cargo. In implementations the weight data is provided by a trusted party, such as manufacturer or packager, and as part of the blockchain, hence in a manner which inhibits interference.

The vehicle may include a temperature sensor and/or humidity sensor, coupled to the controller, to provide temperature and/or humidity data. This may be used to monitor, and record in one or more of the blockchains, whether or not tolerance conditions for the packages have been maintained. The tolerance condition(s) of a package may be defined by the package data; the controller may apply the tightest tolerance limit of the set of packages carried e.g. a lowest maximum tolerated temperature or humidity. Such a temperature and/or humidity sensor may also be used, e.g. in combination with the sensed weight, to identify the presence of people who should not be present such as illicit human cargo. The controller may then generate alert data, which may be incorporated in a new (updated) transport blockchain, and/or a user e.g. driver alert may be produced.

The controller may be configured to identify a location of the vehicle and a corresponding time at a plurality points along a route of the vehicle. Updated package blockchain data for each of the packages may be generated incorporating this data; this may comprise a new package block. Updated vehicle blockchain data, in particular a new transport blockchain, may also be generated incorporating this data. Thus the latest transport blockchain may identify, for each of a series of waypoints, the vehicle location and corresponding time for each of the points. The location of the vehicle may be determined using a satellite-based positioning system such as GPS and/or for example using infrastructure-based vehicle detection technology such as transponder or number plate recognition technology located e.g. at points on a road or border crossing. This information, when incorporated into the transport blockchain, can provide additional security against illicit use of the vehicle, and/or verification of correct collection and delivery of goods without tampering.

The package data may include data such as goods value data, package loading time data, package destination data, and goods expiry time data. The controller may be configured to determine a route for the vehicle responsive to the goods value data, package loading time data, package destination data, and goods expiry time data e.g. to optimize a delivered value, or minimise loss of value of the goods, when delivering the packages. Any suitable routing algorithm may be employed. In some implementations the as goods value data and goods expiry time data may be linked, that is there may be a series of increasingly lower values for the goods depending upon elapsed time, which may be taken into account by the routing algorithm, e.g. as a cost in its optimization procedure. The data collected during use of the system may be employed in training a machine learning system to improve the route planning/optimization.

In some implementations the package data may include data such as: goods value data defining a value of the goods and one or both of a currency of the value of the goods and a tax code of the goods (i.e. data defining a rate at which the goods should be taxed, either as an index or as the tax rate itself). The controller may use location data, e.g. as previously described, to identify a border crossing location. In response it may generate updated package blockchain data for each of the packages e.g. by adding a block to the package blockchain. The updated package blockchain data may include an updated value of the goods dependent upon the currency and/or tax code. Additionally or alternatively the controller may generate updated vehicle blockchain data, e.g. a new transport blockchain, to incorporate this information, e.g. using the updated package blockchain data.

Other information, such as information certifying compliance with one or more regulatory conditions e.g. of a country of origin and/or destination, may also be incorporated into the package data and or a transportation blockchain.

The transport blockchain may be linked to a token to control access to data in the transport blockchain. A user interface may be provided for the controller, optionally via a remote server, to enable a user of the vehicle, e.g. a driver, to interrogate the vehicle data and/or package data. The user interface may be configured to enable a user to provide a token for accessing the data in the transport blockchain. Access to the vehicle data and/or package data e.g. in the transport blockchain may be controlled by the token.

In some implementations some or all of the information in the transport and/or other blockchains may be encrypted. A token may then be used to access some or all of the encrypted information. Thus a token may comprise a cryptographic key; there may be a hierarchy of keys and a corresponding hierarchy of tokens, which provide a hierarchy of levels of access to the encrypted data. Access by a token to data in the transport blockchain may be controlled and/or enforced by the system, e.g. the remote server.

A token may include one or both of location information and goods class or other goods identification information, and/or other access control information. Thus in some implementations a token (including a key) may provide selective access to the encrypted information in e blockchain e.g. the transport blockchain. For example, the access may be limited to the particular goods or class of goods specified and/or may be limited up until the goods arrive at a specified location (as identified by the transport blockchain), and/or up until a particular time.

In some implementations a token may include data which is usable by the system to limit use of the token to a specified number of uses and/or to a specific device or group of devices, and the system be configured to implement corresponding limitations. This can help to reduce network traffic, which may otherwise be significant.

There may different tokens for different users or classes of users—for example for a hauler or other goods carrier/transporter, for a vehicle driver/captain/pilot (or other officer), for an end customer/user, and/or for government.

As previously mentioned, the electronic identification system may comprise an RFID (Radio Frequency Identification) communications system. The controller may include an RFID communications system to communicate with each package. The controller may be configured to generate the updated blockchain data, e.g. a new transport blockchain, by communicating with a remote server.

The vehicle may comprise one or more pallets; these may define the goods storage region of the vehicle. In broad terms a pallet may carry a set of one or more packages, and may have a pallet blockchain incorporating the package data of the packages it carries. The controller may obtain package data directly from a package or via the pallet, in particular from a blockchain of the pallet. In some implementations the pallet may perform the electronic functions ascribed above to the vehicle; that is the pallet may be smart and the vehicle dumb.

Thus a pallet may carry one or more of the packages. Each pallet may include a weight sensor for weighting the carried packages; this may be the same weight sensor as described above. A pallet may further comprise a pallet communications system (e.g. an RFID system) for communicating with the electronic identification system of each package and with the controller. The controller may be configured to communicate with the pallet communications system to retrieve the package data. The pallet may have a pallet blockchain including the package data for each of the packages on the pallet, e.g. the pallet blockchain may be linked to the package blockchains. The controller may be configured to generate the updated blockchain data using the pallet blockchain data, and thus a new transport blockchain may be generated by linking the vehicle blockchain to one or more pallet blockchains.

There is also provided a blockchain-based transportation system including a vehicle as described above. The system may further include at least one user terminal. The system may further include at least one server e.g. for communicating with the controller and with the user terminal. The updated blockchain data e.g. a transport blockchain, may be available from the user terminal for electronic verification of, for each package, loading of the package at a first location, delivery of the package to a second location, and/or for verifying a lack of tampering with contents of the vehicle between the first and second locations.

There is also provided a method of blockchain-based transportation verification using a vehicle as described above.

There is further provided processor control code to implement the above described systems and methods, for example on a general purpose computing device, or on a mobile device, or on a digital signal processor (DSP). The code is provided on a non-transitory physical data carrier such as a disk, CD- or DVD-ROM, programmed memory such as non-volatile memory e.g. Flash, or read-only memory (Firmware). Code and/or data to implement embodiments of the system may comprise source, object or executable code in a conventional programming language (interpreted or compiled) such as C, or assembly code, or code for a hardware description language. As the skilled person will appreciate such code and/or data may be distributed between a plurality of coupled components in communication with one another.

There are variants of the above described systems and methods. For example in some implementations the vehicle blockchain referred to above may be substituted by a carrier blockchain e.g. a pallet blockchain. That is, as previously described in some implementations the above-described functions of the vehicle may be performed by a ("smart") pallet, and the vehicle itself may be dumb.

Embodiments of the present disclosure enable the free flow of people and goods between borders without the need for the inspection of goods. The system incorporates wireless sensors, RFID chips, Blockchain security and cameras interconnected through Wi-Fi and the cloud to accomplish the following: (a) Track vehicles, including: country of registration and location within the world; (b) Track goods (perishable and non-perishable), including: (i) country of origin, (ii) movement, (iii) destination, (iv) certification of compliance with applicable EU/UK/USA/Asia or other regulatory standards, (v) applicable tariffs and payment status, (vi) applicable VAT and payment status.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

For a better understanding of the present subject matter and to show how the same may be carried into effect, reference will now be made by way of example to the accompanying drawings in which.

DETAILED DESCRIPTION

Specific embodiments will now be described, by way of example only and with reference to the accompanying drawings having the figure numbers as listed above.

Figure 1:
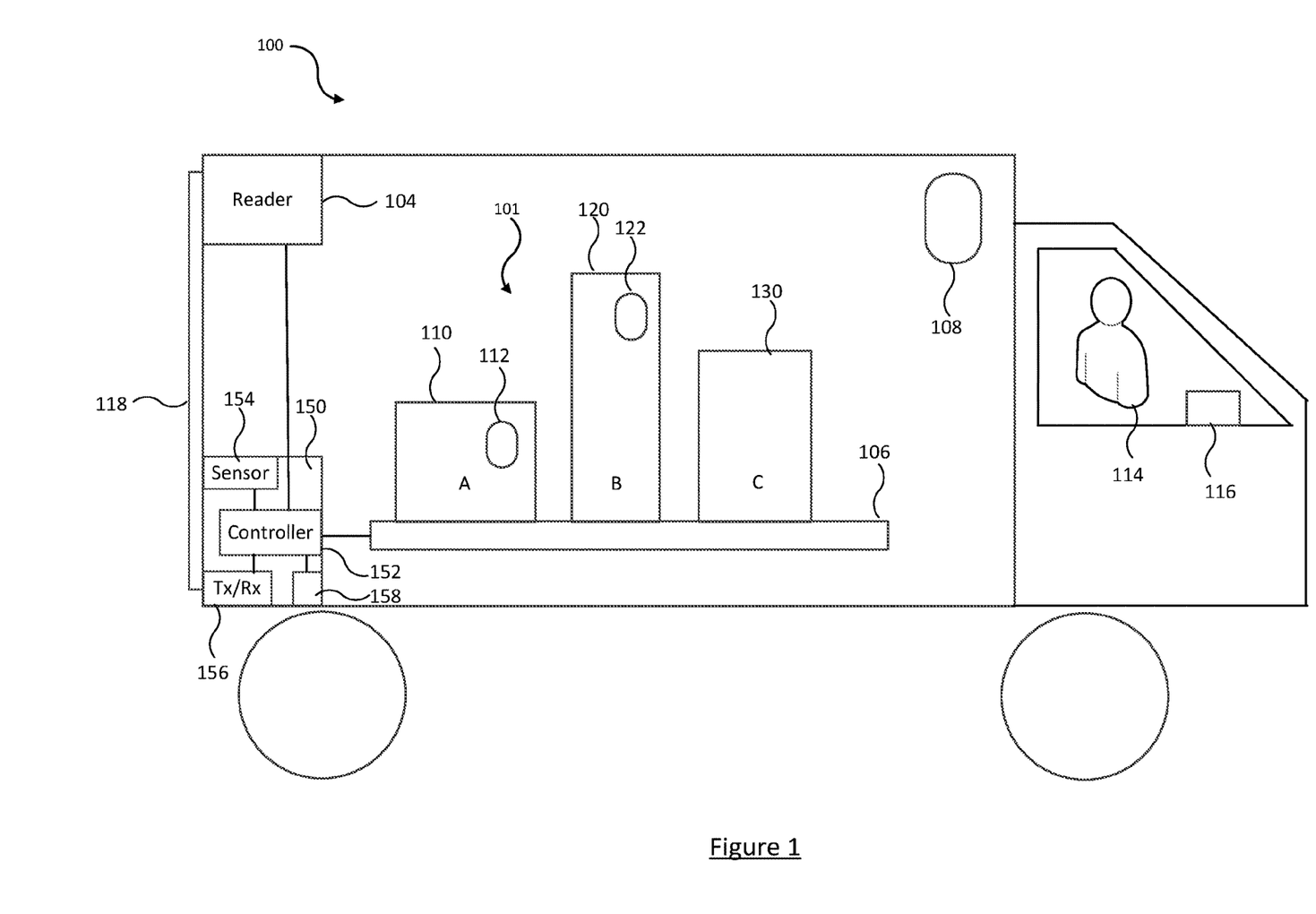
FIG. 1 shows a vehicle for use with a blockchain-based transportation system.

FIG. 1 illustrates a vehicle 100 for use with a blockchain-based transportation system. Whilst FIG. 1 shows the vehicle as a lorry it will be appreciated that this is merely an example. Embodiments of the present disclosure extend to the vehicle being any land vehicle (e.g. train, car etc.), watercraft vehicle (e.g. ship or boat), or aircraft (e.g. plane, drone etc.)

FIG. 1 illustrates the vehicle being operated by a user 114. The vehicle comprises a computer device 116 having a display (user interface) for displaying information (e.g. an alert) to the user 114. Whilst embodiments are described herein with reference to a vehicle that is operated by a user 114, alternatively the vehicle may move autonomously (i.e. be "self-driving") i.e. without the need for a user 114.

The vehicle 100 has a goods storage region 101 configured to hold a plurality of goods packages (shown in FIG. 1 as package A 110, package B 120, and package C 130). The term "package" is used herein to refer to a container (e.g. a cardboard box) housing some goods or the goods themselves when not placed in a container for transportation. The goods can take any form e.g. food, consumer goods, industrial equipment etc.). Whilst FIG. 1 shows three packages being stored in the goods storage region 101 for simplicity it will be appreciated that the goods storage region 101 may be used to transport more, or less than three packages.

The vehicle 100 has a door 118 for allowing packages to be placed into the goods storage region 101 (from outside the vehicle) and for allowing packages to be removed from the goods storage region 101 (and thus removed from the vehicle).

Packages intended to be tracked using the blockchain-based transportation system have a tag (e.g. RFID tag) adhered to it prior to loading onto the vehicle 100. As shown in FIG. 1, package A 110 has an RFID tag 112 on it and package B 120 has an RFID tag 122 on it. Embodiments described herein enable the detection of illicit cargo (e.g. package C 130 in FIG. 1 without an RFID tag).

The vehicle 100 also has one or more readers 104 for wirelessly reading the RFID tags of the packages. The reader(s) 104 may be fixed within the vehicle. Alternatively or additionally, the reader(s) 104 may be located on pallets on which packages are placed.

The reader(s) 104 are configured to communicate with a controller 152 which has an associated memory 158. As shown in FIG. 1, a computing device 150 comprises the controller 152 and memory 158. The functionality of the controller 152 may be implemented in code (software) stored on the memory 158 comprising one or more storage media, and arranged for execution on a processor comprising on or more processing units. The code is configured so as when fetched from the memory and executed on the processor to perform operations in line with embodiments discussed herein. Alternatively it is not excluded that some or all of the functionality of the controller 152 is implemented in dedicated hardware circuitry, or configurable hardware circuitry like an FPGA.

The reader(s) 104 may communicate with the controller 152 by way of a wired or wireless connection.

The vehicle 100 is linked to vehicle blockchain data comprising at least one vehicle block. The vehicle blockchain data may comprise multiple blocks forming a vehicle blockchain. The vehicle blockchain data may be stored in an RFID tag 108 adhered to the vehicle or stored in one or more network devices accessible by the controller 152 via a network. This vehicle blockchain data will be described in more detail later with reference to FIG. 4A.

Before being loaded onto the vehicle 100, the RFID tag 112 of package A 110 is linked to package A blockchain data comprising at least one package block. The package A blockchain data may comprise multiple package blocks forming a blockchain associated with package A 110. The package A blockchain data may be stored in the RFID tag 112 or stored in one or more network devices accessible by the controller 152 via a network. This package A blockchain data will be described in more detail later with reference to FIG. 4B.

Before being loaded onto the vehicle 100, the RFID tag 122 of package B 120 is linked to package B blockchain data comprising at least one package block. The package B blockchain data may comprise multiple package blocks forming a blockchain associated with package B 120. The package B blockchain data may be stored in the RFID tag 122 or stored in one or more network devices accessible by the controller 152 via a network. This package B blockchain data will be described in more detail later with reference to FIG. 4C.

The controller 152 may be coupled to the computer device 116 by way of a wired or wireless connection thereby enabling an alert (as described herein) to be transmitted to the computer device 116. The reader(s) 104 may be coupled to the computer device 116 by way of a wired or wireless connection thereby enabling an alert (as described herein) to be transmitted to the computer device 116.

The vehicle 100 comprises a transceiver 156 coupled to the controller 152. The computing device 150 may comprise a transceiver 156 as shown in FIG. 1, or alternatively the transceiver 156 may be located on the vehicle external to the computing device 150. The controller 152 is configured to transmit data to, and receive data from a remote server via the transceiver 156.

The vehicle 100 may further comprise a door sensor 154 to detect opening and closure of the door 118 of the goods storage region 101. The door sensor 154 is configured to alert the controller 152 when it senses that the door 118 has opened (from a previously closed state) and also alert the controller 152 when it senses that the door 118 has closed (from a previously open state). The computing device 150 may comprise the door sensor 154 as shown in FIG. 1, or alternatively the door sensor 154 may be located on the vehicle external to the computing device 150.

The vehicle 100 may further comprise a package weight sensor 106 (e.g. a pressure pad or weight scales) to sense a weight of the goods packages in the goods storage region 101. The controller 152 is coupled to the package weight sensor 106 and is configured to sense the weight of the packages in response to a weight data received from the package weight sensor 106.

Vehicle scales come in many forms including scales that are embedded in roads and do not require vehicles to slow down. Areas with vehicle scales will also contain embedded wireless sensors that are able to communicate with the controller 152 via the transceiver 156 or the reader(s) 104. Thus the controller 152 may receive weight data indicative of the weight of the goods packages in the goods storage region 101 from a package weight sensor 106 that is external to the vehicle.

The vehicle 100 comprises a location determination module (not shown in FIG. 1) which determines the location of the vehicle 100. The location determination module uses geographic location technology for determining the location of the vehicle 100, in terms of geographic position relative to the surface of the earth; for example, a satellite based positioning system such as GPS (Global Positioning System, including potential variants such as assisted GPS or differential GPS), GLONASS (Global Navigation Satellite System) or Galileo; and/or trilateration (or more generally multilateration) relative to a plurality of different wireless base stations or access points having known locations; and/or a technique based on detecting signal strength relative to a known base station or access point. Other well-known methods may be used by the vehicle 100 to determine its location. In one embodiment, the computer device 116 comprises the location determination module. In one embodiment, the computing device 150 comprises the location determination module. In one embodiment, a reader 104 on the vehicle comprises the location determination module.

The vehicle 100 is associated with a unique identifier. This unique identifier may be stored in memory 158 on the computing device 150, in memory on the computer device 116, or elsewhere on the vehicle accessible by the controller 152.

In embodiments, whereby a reader 104 is located on a pallet, the reader 104 may comprise a location determination module for determining the location of the pallet, in terms of geographic position relative to the surface of the earth. In these embodiments, the reader 104 is associated with a unique identifier so that the location of its contents can be monitored in real time.

Figure 2:
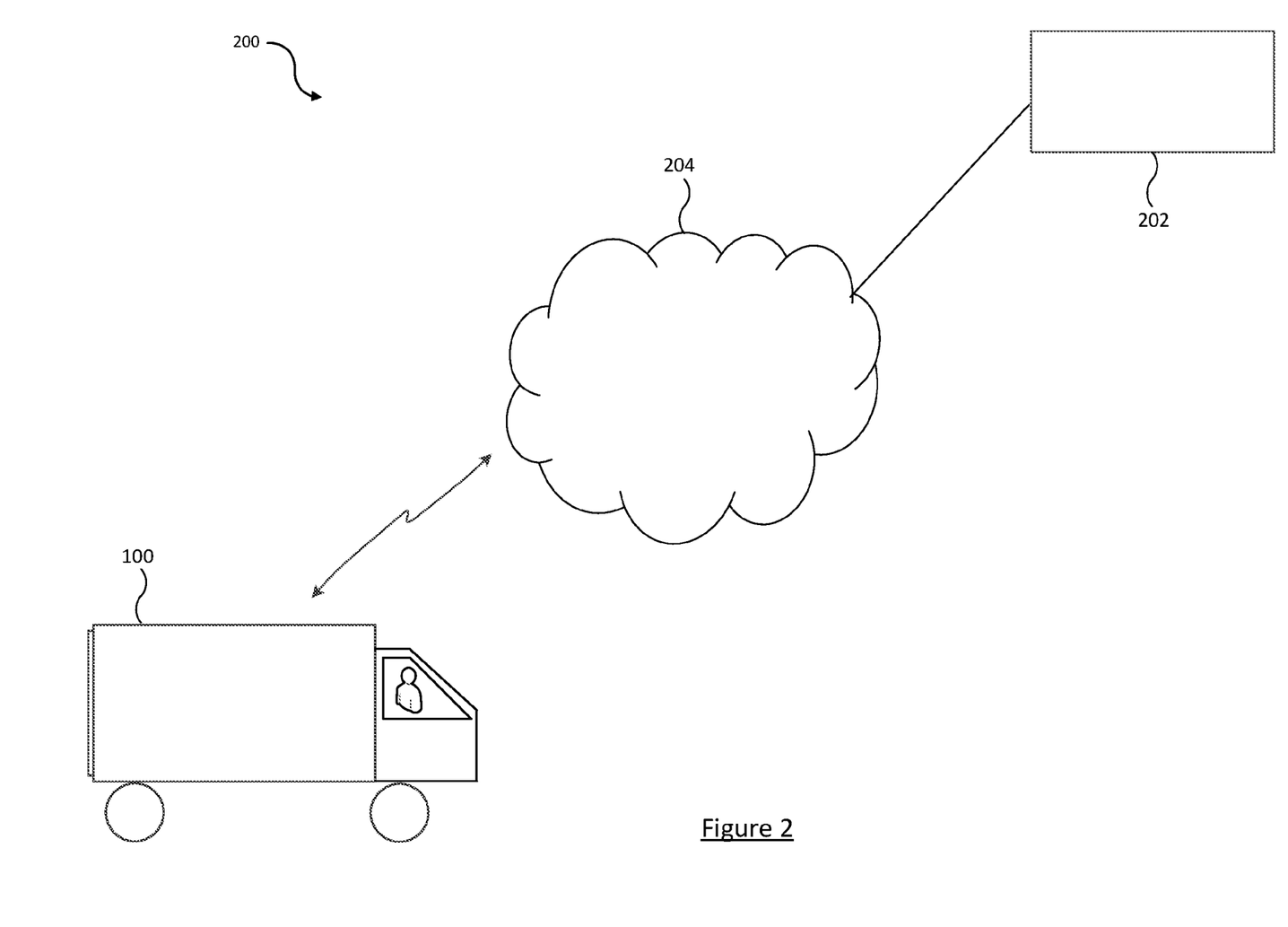
FIG. 2 shows a blockchain-based transportation system.

FIG. 2 illustrates a blockchain-based transportation system 200.

As shown in FIG. 2, the blockchain-based transportation system 200 comprises the vehicle 100 communicating via a network 204 to a remote server 202. The network 204 may be any suitable network which has the ability to provide a communication channel between the vehicle 100 and the remote server 202. For example, the network 204 may comprise the Internet.

Whilst the blockchain-based transportation system 200 is shown in FIG. 2 as having only a single vehicle for simplicity it will be appreciated that the blockchain-based transportation system 200 may comprise multiple vehicles (each associated with a unique identifier).

In embodiments, packages are tracked from dispatch to delivery using the RFID tags adhered to the packages that are read by the reader(s) 104 that are on the vehicle and/or on each pallet of goods. The reader(s) 104 communicate with each other and transfer data to the remote server 202 via the network 204. Each package has its unique blockchain which identify its type of goods (fresh food or other type of food, consumer goods, etc.) include chemicals or flavouring if any, make, model, expiration date, materials used, date made produced, expiration date, weight, etc.

Figure 3:
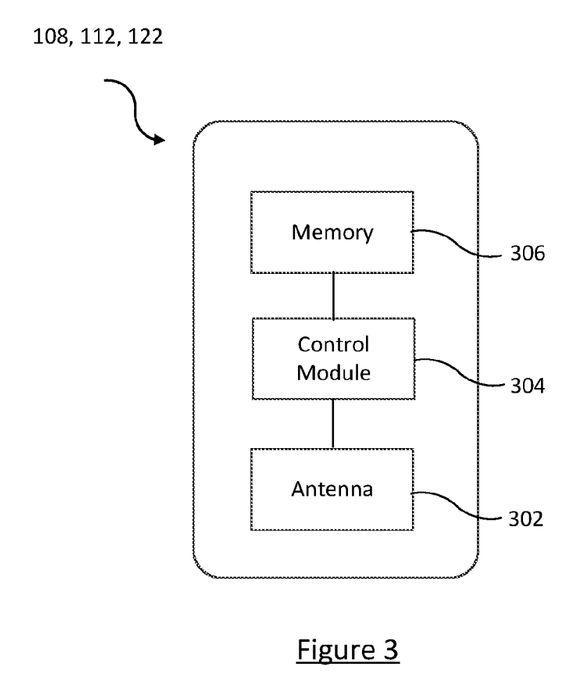
FIG. 3 shows a schematic diagram of an RFID tag.

FIG. 3 shows a schematic diagram of the RFID tag 108, 112, 122.

As shown in FIG. 3 the RFID tag comprises an antenna 302, a control module 304 and a memory 306. The memory 306 may be used to store blockchain data. The control module 304 controls the delivery of the blockchain data from the memory 306 to a reader via the antenna 302.

An RFID tag 108, 112, 122 may be a passive RFID tag (scannable and printable on a sticker at a cost of a few pennies) and may be used for example used for low value packages. Alternatively an RFID tag 108, 112, 122 may be an active RFID tag that actively transmits information and can be read by a reader at a larger distance, and may be used for higher value packages.

Figure 4A:
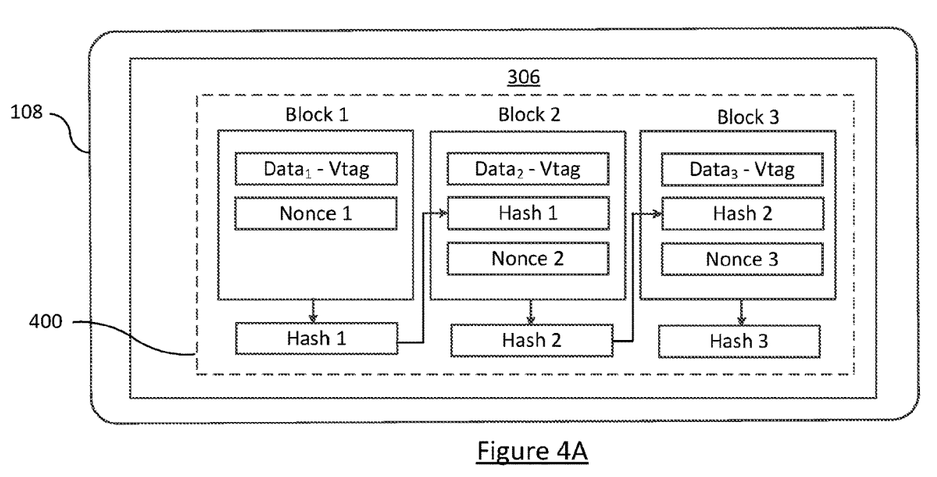
FIG. 4a is a schematic diagram of a vehicle blockchain stored in a tag associated with a vehicle.

FIG. 4A illustrates an RFID tag 108 storing a vehicle blockchain 400 in memory 306 when the vehicle is empty and has not begun its journey. The RFID tag 108 is shown as storing the three data blocks (blocks 1-3) and will also store a hash value (Hash 3) associated with the vehicle blockchain 400. Whilst FIG. 4A illustrates the vehicle blockchain 400 comprising three data blocks, this is merely an example.

The reader(s) 104 will read the RFID tag 108 and transmit information to the remote server 202 in real time. Information that will be relayed by the transceiver 156 may include one or more of: vehicle registration number; vehicle country of registration; vehicle make and model; vehicle colour; road tax and inspection status; driver identity; driver nationality status via communication with passport RFID chip; vehicle weight including one or more: (i) actual weight before and after addition of goods for transfer, (ii) either actual weight of passenger(s) or an estimated weight, (iii) either actual fuel weight or estimated fuel weight, and (iv)

either estimated change in weight due to fuel expenditure or actual change in weight due to fuel expenditure; journey origin; time of departure; destination(s), including destination across the border; time of arrival; and clock information (timestamp(s)).

Figure 4B:
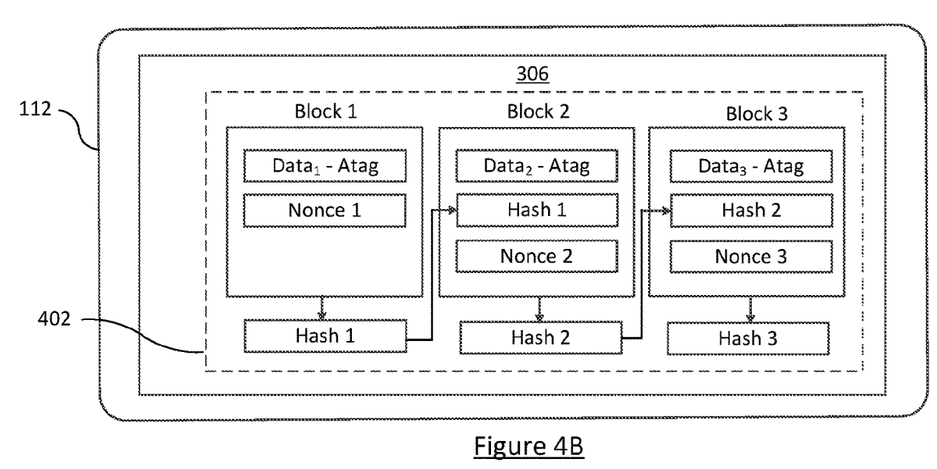
FIG. 4b is a schematic diagram of a first package's blockchain stored in a tag associated with the first package.

FIG. 4B illustrates an RFID tag 112 storing a package blockchain 402 of package A 110 in memory 306 when package A 110 has not been loaded onto the vehicle 100. The RFID tag 112 is shown as storing the three data blocks (blocks 1-3) and will also store a hash value (Hash 3) associated with the package blockchain 402 of package A 110. Whilst FIG. 4B illustrates the package blockchain 402 of package A 110 comprising three data blocks, this is merely an example.

Figure 4C:
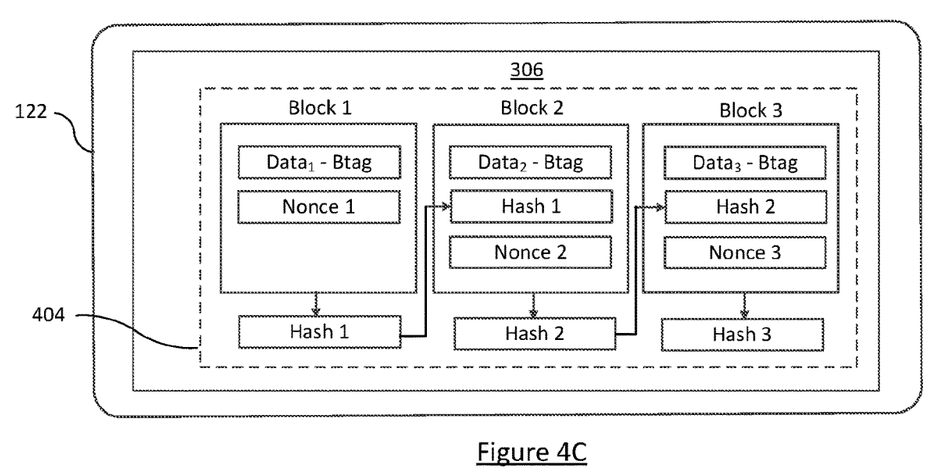
FIG. 4c is a schematic diagram of a second package's blockchain stored in a tag associated with the second package.

FIG. 4C illustrates an RFID tag 122 storing a package blockchain 404 of package B 120 in memory 306 when package B 120 has not been loaded onto the vehicle 100. The RFID tag 122 is shown as storing the three data blocks (blocks 1-3) and will also store a hash value (Hash 3) associated with the package blockchain 404 of package B 120. Whilst FIG. 4B illustrates the package blockchain 404 of package B 120 comprising three data blocks, this is merely an example.

At manufacturing or dispatch, each individual package of a good or goods will have an RFID tag that is linked to a blockchain that provides information in a plurality of data blocks. The information may comprise one or more of: (A) unique ID; (B) category of good (e.g. electronics, produce, perishable, non-perishable, etc.); (C) description of the goods; (D) country of origin; (E) manufacturer/producer details including company number; (F) VAT/exporter number; (G) whether a manufacturer has been certified as complying with EU and/or UK regulations; (H) whether the good is certified as compliant with on or more of UK regulations, EU regulations; foreign regulations; (I) date of manufacture/production; (J) required storage conditions; (K) date of expiry (if applicable); and (M) importer details including VAT number.

Figure 5A:
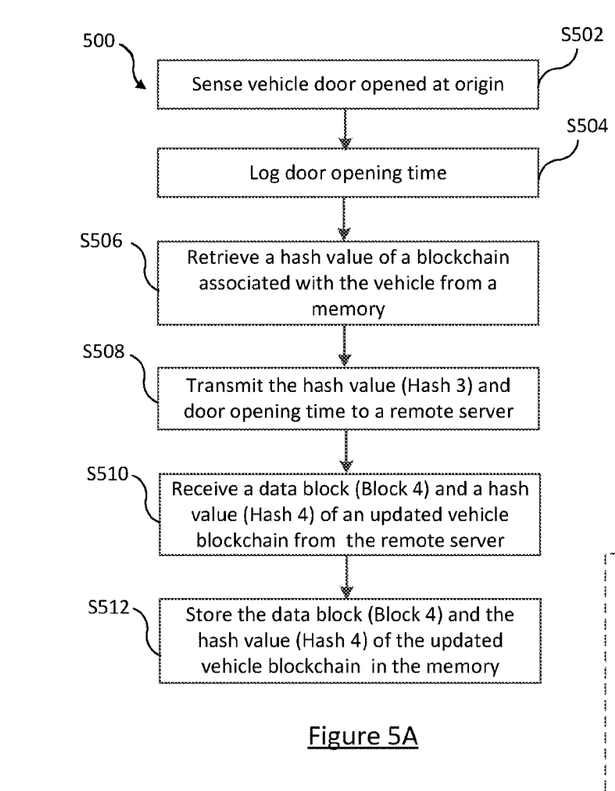
FIG. 5A is a flowchart of a method of updating the vehicle blockchain and FIG. 5B illustrates how the vehicle blockchain may be updated.
Figure 5B:
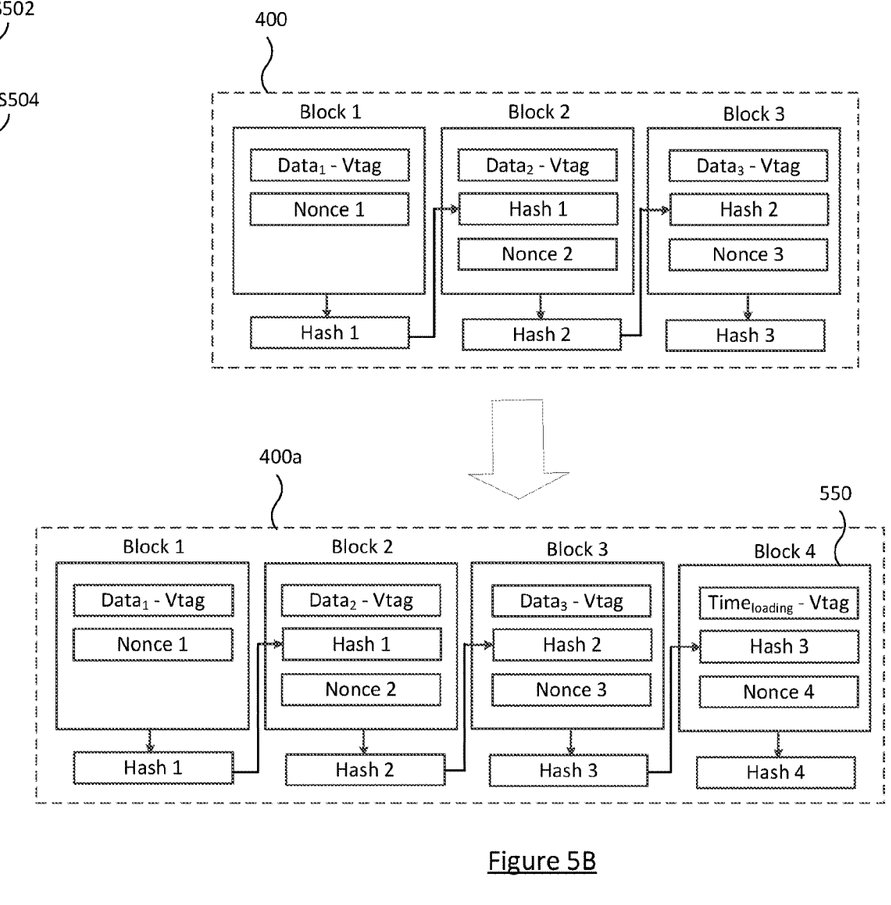

FIG. 5A is a flowchart 500 of a method of updating the vehicle blockchain 400 and FIG. 5B illustrates how the vehicle blockchain 400 may be updated.

At step S500, the door sensor 154 sensing the opening of the door 118 at the origin of a journey that the vehicle 100 is to undertake.

At step S504, the controller 152 receives a signal from the door sensor 154 when it senses that the door 118 has opened (from a previously closed state), and the controller 152 logs a door opening time at step S504.

At step S506, the controller 152 retrieves a hash value of the vehicle blockchain 400 from a memory. The retrieved hash value of the vehicle blockchain 400 is a hash value of an end block of the vehicle blockchain 400. FIG. 5B illustrates an example vehicle blockchain 400 which comprises three data blocks (blocks 1-3) and the hash value of the vehicle blockchain 400 therefore corresponds to 'Hash 3'. The controller 152 may retrieve the hash value of the vehicle blockchain 400 from memory 158. Alternatively the controller 152 may communicate with reader 104 to retrieve the hash value of the vehicle blockchain 400 from memory 306 on the vehicle RFID tag 108.

At step S508 the controller 152 transmits the hash value of the vehicle blockchain 400 and the logged door opening time via the transceiver 156 over the network 204 to the remote server 202.

The remote server 202 generates updated vehicle blockchain data by generating a new data block 550 'Block 4' using the hash value 'Hash 3' and the logged door opening time. The remote server 202 thereby generates an updated vehicle blockchain 400a as illustrated in FIG. 5B and computes a new hash value 'Hash 4' for the updated vehicle blockchain 400a.

At step S510, the remote server 202 transmits the new data block 550 and new hash value 'Hash 4' for the updated vehicle blockchain 400a over the network 204 to the vehicle 100. The controller 152 receives the new data block 550 and new hash value 'Hash 4' for the updated vehicle blockchain 400a via the transceiver 156.

At step S512, the controller 152 stores the received new data block 550 and new hash value 'Hash 4' for the updated vehicle blockchain 400a in the memory referred to above (e.g. memory 158 or memory 306 on the vehicle RFID tag 108).

Whilst we have referred above to the vehicle blockchain 400a being updated with a data block comprising a loading time. It will be appreciated that additional or alternative data may be added to the vehicle blockchain 400 in one or more data blocks e.g. weather or traffic information which may affect the vehicle's journey).

Furthermore whilst the process 500 is described above with reference to the remote server 202 generating updated vehicle blockchain data this may be performed locally by the controller 152.

Figure 6A:
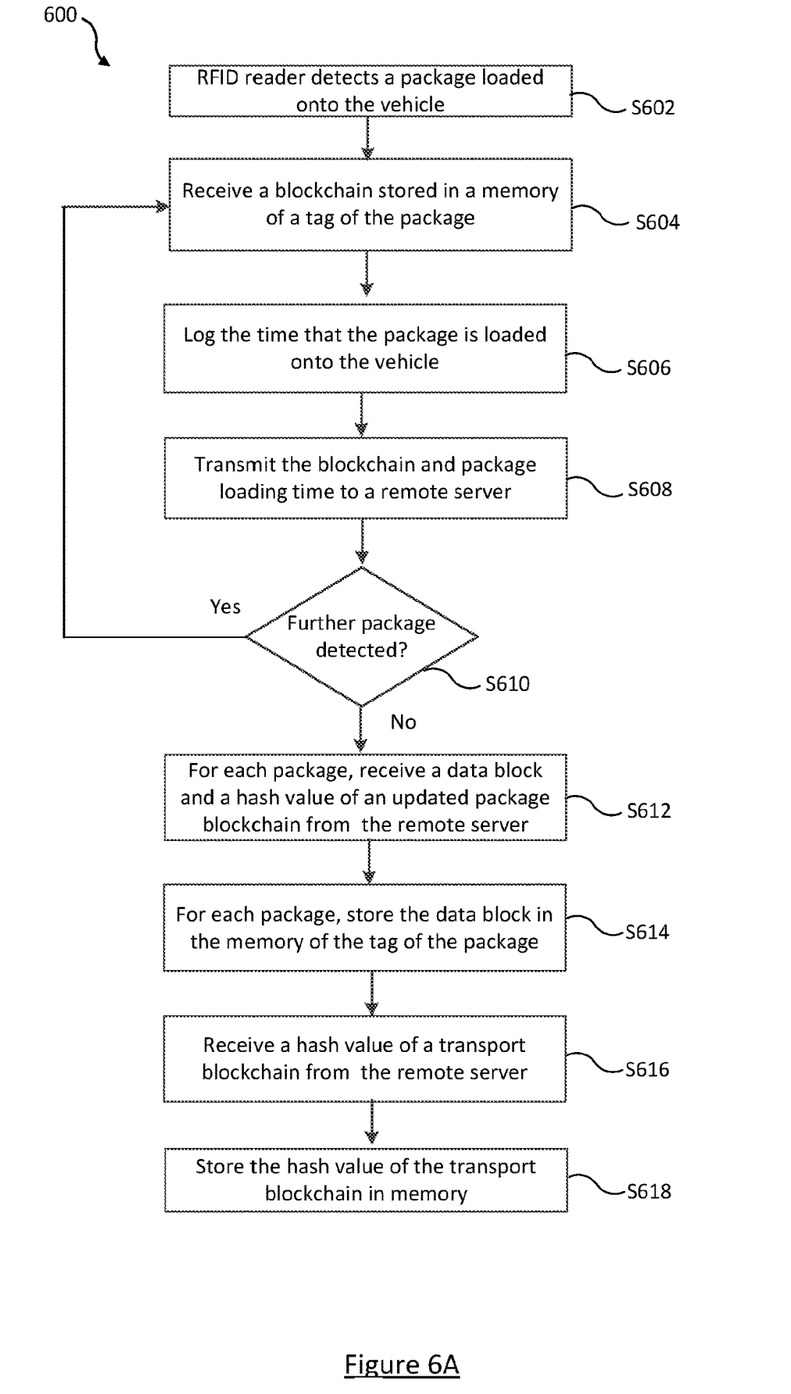
FIG. 6A is a flowchart of a method performed by the vehicle in updating each package's blockchain and the generation of a transport blockchain once packages are loaded onto the vehicle.

FIG. 6A is a flowchart of a method 600 performed by the vehicle 100 in updating each package's blockchain and the generation of a transport blockchain once packages are loaded onto the vehicle 100.

At step S602 the reader 104 detects a package that has been loaded onto the vehicle 100.

The reader 104 retrieves a package blockchain stored in memory 306 of the tag and transmits the package blockchain to the controller 152. The controller 152 receives the package blockchain at step S604.

At step S606, the controller 152 logs the time that the package is loaded onto the vehicle 100.

At step S608, the controller 152 transmits the package blockchain and the logged package loading time via the transceiver 156 over the network 204 to the remote server 202.

The process described above is repeated for all of the packages that are loaded on to the vehicle 100.

At step S610, the controller 152 detects that there are no further packages to be loaded on the vehicle. The controller 152 may perform step S610 in a number of different ways. For example, the controller 152 may detect that there are no further packages to be loaded on the vehicle based on receiving a signal from the door sensor 154 indicating that the door 118 has been closed. In another example, the controller 152 may detect that there are no further packages to be loaded on the vehicle based on a predetermined period of time elapsing since the last detected package. At step S610, the controller 152 transmits an indication that there are no further packages to be loaded on the vehicle to the remote server 202.

For each package, the remote server 202 generates updated package blockchain data by generating a new data block using (i) the hash value computed from the package blockchain and (ii) the logged door opening time. The remote server 202 thereby generates an updated package blockchain and computes a new hash value for the updated package blockchain.

At step S612, for each package the remote server 202 transmits the new data block and new hash value for the updated package blockchain over the network 204 to the vehicle 100. The controller 152 receives the new data block and new hash value for the updated package blockchain via the transceiver 156.

At step S614, for each package the controller 152 communicates with the reader 104 to store the new data block and new hash value for the updated package blockchain in memory 306 of the appropriate tag.

Figure 6B:
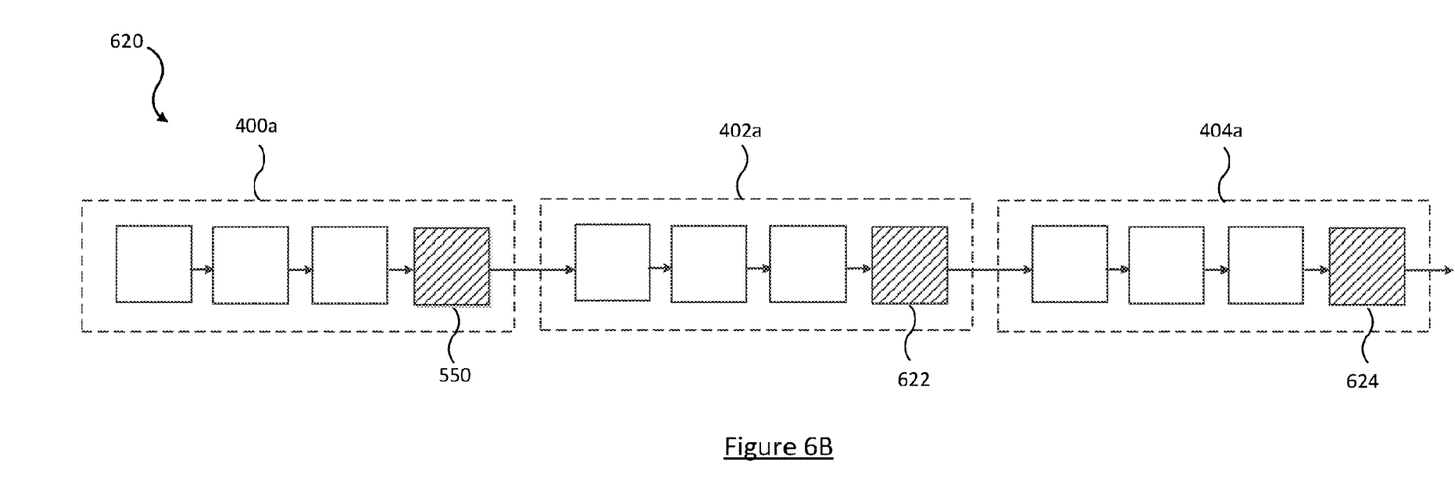
FIG. 6B shows a schematic diagram of a transport blockchain.

The remote server 202 is also configured to generate a transport blockchain by linking the updated package blockchain of each package to the updated vehicle blockchain. FIG. 6B illustrates a transport blockchain that is generated using the updated vehicle blockchain 400a, an updated package blockchain 402a of package A 110 and an updated package blockchain 402b of package A 120.

The updated vehicle blockchain 400a has been discussed above with reference to FIGS. 5A and 5B.

The updated package blockchain 402a of package A 110 comprises a data block 622 received at step S612. The data block 622 may comprise a timestamp indicative of when package A 110 was loaded onto the vehicle. The data block 622 may comprise a timestamp indicative of an expiry time of the goods (if applicable) computed by the remote server 202 based on goods category data read from the package blockchain 402 and/or data read from the vehicle blockchain 400 (e.g. temperature of the goods storage region 101).

Similarly, the updated package blockchain 404a of package B 120 comprises a data block 624 received at step S612. The data block 624 may comprise a timestamp indicative of when package B 120 was loaded onto the vehicle. The data block 624 may comprise a timestamp indicative of an expiry time of the goods (if applicable) computed by the remote server 202 based on goods category data read from the package blockchain 404 and/or data read from the vehicle blockchain 400 (e.g. temperature of the goods storage region 101).

The remote server 202 generates the transport blockchain by incorporating the hash value of the updated vehicle blockchain 400a into a genesis block of the updated package blockchain 402a of package A 110. The resulting hash value of this linked chain is incorporated into a genesis block of the updated package blockchain 404b of package B 120. The hash value of the transport blockchain 620 is a hash value of the end block i.e. a hash value of data block 624.

At step S616, the remote server 202 transmits the hash value of the transport blockchain 620 over the network 204 to the vehicle 100. The controller 152 receives the hash value of the transport blockchain 620 via the transceiver 156.

At step S618, the controller 152 stores the hash value of the transport blockchain 620 in memory. The controller 152 may store the hash value of the transport blockchain 620 in memory 158. Alternatively the controller 152 may communicate with reader 104 to store the hash value of the transport blockchain 620 in memory 306 on the vehicle RFID tag 108.

Whilst we have referred above to the package blockchains being updated with a data block comprising a loading time. It will be appreciated that additional or alternative data may be added to the package blockchains in one or more data blocks.

Furthermore whilst the process 600 is described above with reference to the remote server 202 generating a transport blockchain this may be performed locally by the controller 152.

Figure 6C:
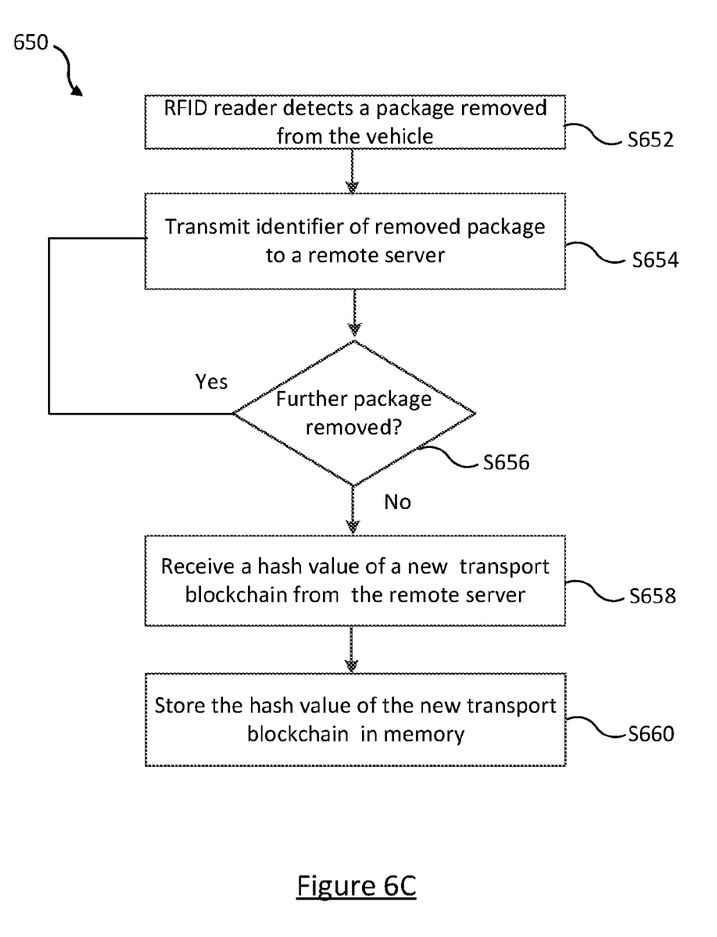
FIG. 6C is a flowchart of a method performed by the vehicle in the generation of a transport blockchain once packages are removed from the vehicle.

FIG. 6C is a flowchart of a method 650 performed by the vehicle in the generation of a transport blockchain once packages are removed from the vehicle during its journey.

At step S652, the reader 104 detects a package that has been removed from the vehicle 100.

At step S654, the controller 154 transmits an identifier of the removed package to the remote server 202. This identifier may be hash value of the package blockchain or an identifier from one of the data blocks in the package blockchain.

The process described above is repeated for all of the packages that are removed from the vehicle 100.

At step S656, the controller 152 detects that there are no further packages to be removed from the vehicle. The controller 152 may perform step S610 in a number of different ways. For example, the controller 152 may detect that there are no further packages to be removed from the vehicle based on receiving a signal from the door sensor 154 indicating that the door 118 has been closed. In another example, the controller 152 may detect that there are no further packages to be removed from the vehicle based on a predetermined period of time elapsing since the last detected package. At step S656, the controller 152 transmits an indication that there are no further packages to be removed from the vehicle to the remote server 202.

The remote server 202 generates a new transport blockchain by linking the package blockchain of each package remaining in the vehicle to the vehicle blockchain.

Prior to generating the new transport blockchain, the vehicle blockchain may be updated using the process illustrated in FIGS. 5A and 5B (e.g. to include a timestamp indicative of the time that the vehicle reached this point in the journey). Similarly, for each package remaining on the vehicle, the package blockchain associated with the package may be updated.

At step S658, the remote server 202 transmits the hash value of the new transport blockchain over the network 204 to the vehicle 100. The controller 152 receives the hash value of the new transport blockchain via the transceiver 156.

At step S660, the controller 152 stores the hash value of the new transport blockchain in memory. The controller 152 may store the hash value of the new transport blockchain in memory 158. Alternatively the controller 152 may communicate with reader 104 to store the hash value of the new transport blockchain in memory 306 on the vehicle RFID tag 108.

Whilst the process 650 is described above with reference to the remote server 202 generating a new transport blockchain this may be performed locally by the controller 152.

In embodiments, the RFID tags are scanned at source and registered via the cloud (network 204). The package/goods information is automatically uploaded to the cloud-based network and the unique hash values of the blockchains, VAT, tariffs and other monies due on the product are calculated and assigned to the payee(s) for payment by direct-debit (if set up) or on account, becoming chargeable on the products when they leave the source company, cross the border or when goods are accepted across the border.

The location of the goods will be relayed by a location determination module on the vehicle and/or a location determination module on a pallet in the vehicle.

Goods may be scanned at the origin, destination and any point between the origin and destination to record receipt. Goods may also be scanned when sold. Every scan by a reader of a package will update the blockchain associated with the package with a new hash value.

Stores can implement periodic random inspections of goods during which RFID tags will be scanned. Penalties can be assessed for storing and selling unauthorised and untagged goods.

A wireless GPS enabled sensor or a reader with a unique ID may be applied to each pallet on which goods are placed. Goods are loaded onto a pallet. In these embodiments, the sensors (or the readers) will read the RFID tags, communicate with sensors on other pallets and detect, record and transfer the information in real time via the cloud, the information may include one or more of: (A) all information on the RFID tags and its blockchain hash value value on packaged goods, including number, type and weight and clock; (B) number of other pallets in the delivery, including information on the RFID tags; (C) distance between pallets; (D) movement due to forces such as road bumps (for monitoring storage conditions); (E) temperature (for monitoring storage conditions); (F) humidity (for monitoring storage conditions); (G) location; (H) weight; and (I) clock (timestamp(s)).

The unique ID and RFID tags will be traceable throughout their journey to their final destination. As soon as the package is dispatched, it will be registered via the cloud (network 204) and its storage conditions will be monitored in real time.

As the pallet sensors read and store RFID information, calculate weight and register location with GPS, they will detect exactly which goods are placed on the pallet and when and where each individual product is removed, communicating the information to the cloud in real time.

Storage conditions can also be communicated in real time. This will enable enhancements in packing, storage and transfer methods to prevent product damage and spoilage.

The window for transferring goods will be registered on the products. Should the goods fail to be transferred within the window, this will appear on the network and will register again when products are scanned.

The wireless sensors on each pallet of goods will communicate with each other and the wireless sensor (reader) on the vehicle (if present), and will track entire deliveries of goods from dispatch to delivery.

In one embodiment of the blockchain-based transportation system 200 vehicles must be registered and authorised for transport of goods and all vehicles that travel across the border must have an authorisation to go between the two countries. Cameras will recognise license plates and communicate with sensors in and around the border area. If a camera catches an unauthorised vehicle at any time, the person or company will receive a fine or other such penalty that the government deems fit.

The goods and pallet are loaded in/on to a vehicle. Weight is sensed and all details from the manufacturer with a date of delivery to the UK, car registration and driver have been consolidated. That information goes to the cloud. The vehicle then proceeds across the border.

In embodiments, the pallets and vehicle will all have GPS and a record of goods contained in each pallet, thus all will be traceable as they cross into the country.

Vehicle scales come in many forms including scales that are embedded in roads and do not require vehicles to slow down. Areas with vehicle scales will also contain embedded wireless sensors that communicate with the vehicle and pallet sensors.

If a vehicle weighs above the range that the sensor has calculated that it should weigh, this could indicate the presence of unauthorised goods or people (e.g. illicit cargo shown as package C in FIG. 1 without an RFID tag). An inspection including the scanning of RFID tags, passports, pallet sensors and/or vehicle sensors would yield prima fascia evidence of regulation compliance or violation.

In one embodiment of the blockchain-based transportation system 200 a system of readers for ID RFIDs will be deployed at strategic locations at and around the border and in border towns to complement cameras and readers that detect and transmit vehicle and pallet information in real time. To allow for the possibility of lower quality readers being deployed for ID RFID readers, speed restrictions will be put in place in ID RFID reading areas. These restrictions can be put into place with few disruptive effects in the following areas: (A) bridges; (B) tunnels; (C) lay-bys; (D) road curvatures; (E) high traffic density; (F) areas with a high number of pedestrians on foot; (G) around petrol stations and shops. This will update the Blockchain [Clock] in a real time.

The transport blockchain may be linked to a token to control access to data in the transport blockchain. A token may be issued at the time of adding a new blockchain to generate the transport blockchain. Different tokens may enable different users to view the relevant information such as train arrival, goods destination and dispatch time, goods travel time, travel methods etc.

Generally, any of the functions described herein can be implemented using software, firmware, hardware (e.g., fixed logic circuitry), or a combination of these implementations. The terms "functionality" and "module" as used herein generally represent software, firmware, hardware, or a combination thereof. In the case of a software implementation, the functionality or module represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

The invention has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A vehicle for use with a blockchain-based transportation system for automated assessment of transportation of goods, the vehicle comprising:

a goods storage region configured to carry one or more goods packages, each package having a package tag, the package tag comprising an electronic identification system including a package blockchain defined by package blockchain data comprising a package block, the package block comprising package data including at least a package identifier;

a vehicle blockchain defined by vehicle blockchain data comprising a vehicle block, the vehicle block comprising vehicle data including at least a vehicle identifier, wherein the vehicle blockchain is uniquely associated with the vehicle; and a controller configured to communicate with the electronic identification system of each package to retrieve the package blockchain data and to generate updated blockchain data using the vehicle blockchain data and the retrieved package data of each package;

wherein the updated blockchain data is available for assessment of transportation of the goods packages
wherein the package data includes a package weight, wherein the updated blockchain data includes data defining a total weight of the packages, wherein the vehicle data includes a weight data defining a weight of the vehicle and passengers, and wherein the controller is configured to report, to a remote server for verification, a total weight of the vehicle, of the packages in the goods storage region, and of the passengers.

2. A vehicle as claimed in claim 1 wherein the controller is configured to generate updated blockchain data by linking the package blockchain of each package to the vehicle blockchain to generate a first transport blockchain, wherein the first transport blockchain comprises at least the vehicle data and the package data, for each package.

3. A vehicle as claimed in claim 2 further comprising a door sensor to detect closure of a door to the goods storage region, and wherein the controller is configured to generate the updated blockchain data in response to the door sensor detecting closure of the door.

4. A vehicle as claimed in claim 2 wherein the controller is configured to automatically detect removal of one or more of the packages from the goods storage region and to generate a second transport blockchain, wherein the second transport blockchain comprises at least the vehicle data and the package data for each package remaining in the goods storage area.

5. A vehicle as claimed in claim 3 wherein the controller is configured to automatically detect removal of one or more of the packages from the goods storage region and to generate a second transport blockchain, wherein the second transport blockchain comprises at least the vehicle data and the package data for each package remaining in the goods storage area.

6. A vehicle as claimed in claim 5 wherein the door sensor is configured to detect opening of the door to the goods storage region, wherein the controller is configured to automatically detect removal of one or more of the packages from the goods storage region in response to the door sensor detecting opening of the door, and wherein the controller is further configured to generate the second transport blockchain in response to the door sensor detecting closure of the door.

7. A vehicle as claimed in claim 1 wherein the package data includes a package weight, wherein the updated blockchain data includes data defining a total weight of the packages, wherein the goods storage region includes a package weight sensor to sense a weight of the packages in the goods storage region; and wherein the controller is configured to check the sensed weight of the goods packages with the total weight of the packages, and to generate alert data and/or an alert in response to a mismatch.

8. A vehicle as claimed in claim 7 further comprising a temperature sensor and/or humidity sensor coupled to the controller, wherein the wherein the controller is configured to combine temperature and/or humidity data from the temperature sensor and/or humidity sensor with the sensed weight to generate the alert data and/or alert, wherein the alert data and/or alert identifies the presence of illicit human cargo.

9. A vehicle as claimed in claim 1 wherein the controller is configured to identify a location of the vehicle and a corresponding time at a plurality points along a route of the vehicle and, for each of the points, to generate updated package blockchain data for each of the packages, the updated package blockchain data including the vehicle location and corresponding time for each of the points, and then to generate updated vehicle blockchain data using the updated package blockchain data.

10. A vehicle as claimed in claim 9 wherein the package data includes goods value data, package loading time data, package destination data, and goods expiry time data, and wherein the controller is configured to determine a route for the vehicle responsive to the goods value data, package loading time data, package destination data, and goods expiry time data to optimize a delivered value of the goods when delivering the packages.

11. A vehicle as claimed in claim 9 wherein the package data includes goods value data defining a value of the goods and one or both of a currency of the value of the goods and a tax code of the goods, and wherein the controller is configured to identify a border crossing location and, in response, to generate updated package blockchain data for each of the packages, the updated package blockchain data including at least an updated value of the goods dependent upon the currency and/or tax code, and to generate updated vehicle blockchain data using the updated package blockchain data.

12. A vehicle as claimed in claim 2, wherein the transport blockchain is linked to a token to control access to data in the transport blockchain, and further comprising a user interface for the controller to enable a user of the vehicle to interrogate the vehicle data and/or package data, wherein the user interface is configured to enable a user to provide a token for accessing the data in the transport blockchain, and wherein access to the vehicle data and/or package data in the transport blockchain is controlled by the token.

13. A vehicle as claimed in claim 1 wherein the electronic identification system comprises an RFID communications system, wherein the controller includes an RFID communications system to communicate with each package, and wherein the controller is configured to generate the updated blockchain data by communicating with a remote server.

14. A vehicle as claimed in claim 1 comprising one or more pallets for carrying one or more of the packages, wherein each pallet includes a weight sensor for weighting the carried packages, and a pallet communications system for communicating with the electronic identification system of each package and with the controller, wherein the controller is configured to communicate with the pallet communications system to retrieve the package data, wherein the pallet has a pallet blockchain including the package data for each of the packages on the pallet, and wherein the controller is configured to generate the updated blockchain data using the pallet blockchain data.

15. A blockchain-based transportation system including a vehicle as claimed in claim 1, at least one user terminal, and at least one server for communicating with the controller and with the user terminal, wherein the updated blockchain data is available from the user terminal for electronic verification of, for each package, loading of the package at a first location, delivery of the package to a second location, and a lack of tampering with contents of the vehicle between the first and second locations.

16. A method of blockchain-based transportation verification using the vehicle of claim 1 or the blockchain-based transportation system of claim 15.

17. A computer storage medium comprising instructions to implement the method of claim 16.

18. A vehicle for use with a blockchain-based transportation system for automated assessment of transportation of goods, the vehicle comprising:

a goods storage region configured to carry one or more goods packages, each package having a package tag, the package tag comprising an electronic identification system including a package blockchain defined by package blockchain data comprising a package block, the package block comprising package data including at least a package identifier;

a vehicle blockchain defined by vehicle blockchain data comprising a vehicle block, the vehicle block comprising vehicle data including at least a vehicle identifier, wherein the vehicle blockchain is uniquely associated with the vehicle;

a controller configured to communicate with the electronic identification system of each package to retrieve the package blockchain data and to generate updated blockchain data using the vehicle blockchain data and the retrieved package data of each package;

wherein the updated blockchain data is available for assessment of transportation of the goods packages;

wherein the package data includes a package weight, wherein the updated blockchain data includes data defining a total weight of the packages, wherein the goods storage region includes a package weight sensor to sense a weight of the packages in the goods storage region; and wherein the controller is configured to check the sensed weight of the goods packages with the total weight of the packages, and to generate alert data and/or an alert in response to a mismatch; and wherein the vehicle further comprises a temperature sensor and/or humidity sensor coupled to the controller, wherein the controller is configured to combine temperature and/or humidity data from the temperature sensor and/or humidity sensor with the sensed weight to generate the alert data and/or alert, wherein the alert data and/or alert identifies the presence of illicit human cargo.

19. A vehicle for use with a blockchain-based transportation system for automated assessment of transportation of goods, the vehicle comprising:

a goods storage region configured to carry one or more goods packages, each package having a package tag, the package tag comprising an electronic identification system including a package blockchain defined by package blockchain data comprising a package block, the package block comprising package data including at least a package identifier;

a vehicle blockchain defined by vehicle blockchain data comprising a vehicle block, the vehicle block comprising vehicle data including at least a vehicle identifier, wherein the vehicle blockchain is uniquely associated with the vehicle; and a controller configured to communicate with the electronic identification system of each package to retrieve the package blockchain data and to generate updated blockchain data using the vehicle blockchain data and the retrieved package data of each package;

wherein the updated blockchain data is available for assessment of transportation of the goods packages;

wherein the controller is configured to identify a location of the vehicle and a corresponding time at a plurality points along a route of the vehicle and, for each of the points, to generate updated package blockchain data for each of the packages, the updated package blockchain data including the vehicle location and corresponding time for each of the points, and then to generate updated vehicle blockchain data using the updated package blockchain data;

wherein the package data includes goods value data, package loading time data, package destination data, and goods expiry time data, and wherein the controller is configured to determine a route for the vehicle responsive to the goods value data, package loading time data, package destination data, and goods expiry time data to optimize a delivered value of the goods when delivering the packages.

20. A vehicle for use with a blockchain-based transportation system for automated assessment of transportation of goods, the vehicle comprising:

a goods storage region configured to carry one or more goods packages, each package having a package tag, the package tag comprising an electronic identification system including a package blockchain defined by package blockchain data comprising a package block, the package block comprising package data including at least a package identifier;

a vehicle blockchain defined by vehicle blockchain data comprising a vehicle block, the vehicle block comprising vehicle data including at least a vehicle identifier, wherein the vehicle blockchain is uniquely associated with the vehicle; and a controller configured to communicate with the electronic identification system of each package to retrieve the package blockchain data and to generate updated blockchain data using the vehicle blockchain data and the retrieved package data of each package;

wherein the updated blockchain data is available for assessment of transportation of the goods packages;

wherein the controller is configured to identify a location of the vehicle and a corresponding time at a plurality points along a route of the vehicle and, for each of the points, to generate updated package blockchain data for each of the packages, the updated package blockchain data including the vehicle location and corresponding time for each of the points, and then to generate updated vehicle blockchain data using the updated package blockchain data;

wherein the package data includes goods value data defining a value of the goods and one or both of a currency of the value of the goods and a tax code of the goods, and wherein the controller is configured to identify a border crossing location and, in response, to generate updated package blockchain data for each of the packages, the updated package blockchain data including at least an updated value of the goods dependent upon the currency and/or tax code, and to generate updated vehicle blockchain data using the updated package blockchain data.

\* \* \* \* \*